United States Patent [19]

Neil

[11] Patent Number: 4,952,353

[45] Date of Patent: Aug. 28, 1990

[54] HOT ISOSTATIC PRESSING

[75] Inventor: Jeffrey T. Neil, Acton, Mass.

[73] Assignee: GTE Laboratories Incorporated, Waltham, Mass.

[21] Appl. No.: 458,056

[22] Filed: Dec. 28, 1989

[51] Int. Cl.⁵ ............................................... F27B 9/04
[52] U.S. Cl. ..................................... 264/65; 264/125; 264/332; 419/13; 419/17; 419/19; 419/20; 419/49
[58] Field of Search .......................... 264/125, 65, 332; 419/13, 17, 19, 20, 49

[56] References Cited

U.S. PATENT DOCUMENTS

| | | | |
|---|---|---|---|
| 4,023,966 | 5/1977 | Loersch et al. | 419/49 |
| 4,681,702 | 7/1987 | Schreiner et al. | 264/65 |
| 4,756,752 | 7/1988 | Barnard | 264/65 |

Primary Examiner—Stephen J. Lechart, Jr.
Attorney, Agent, or Firm—Frances P. Craig

[57] ABSTRACT

A process for densifying porous articles comprises providing a non-reactive container with a green article and sufficient solid encapsulating agent selected from the group consisting of tin and the tin-magnesium eutectic to encapsulate the green article when the agent is in the molten state. The temperature is raised sufficiently to melt the agent and to encapsulate the article. The encapsulated article is maintained at a pressure below the infiltrating pressure of the green article while heating the encapsulated article sufficiently to create a surface on the article that is essentially free of porosity and thereafter, the pressure on the encapsulated article is increased while maintaining the article at its sintering temperature for a sufficient time to increase the density of said article to at least about 98% of theoretical.

11 Claims, 2 Drawing Sheets

HOT ISOSTATIC PRESSING

FIELD OF THE INVENTION

This invention relates to hot isostatic pressing. More particularly it relates to a process for the manufacture of low porosity articles using hot isostatic pressing.

BACKGROUND OF THE INVENTION

Porosity removal in certain ceramic materials such as silicon nitride based ceramics is difficult but yet such porosity removal is required for many uses of these ceramics such as cutting tools.

Hot isostatic pressing (HIPing) is an effective means of porosity removal. Because of the relatively high temperatures required for porosity removal and the complex geometrics required in the ceramic, various glasses are used as the encapsulating agent. The encapsulating agent converts the gas pressure of the HIP to physical pressure against the ceramic.

U.S. Pat. No. 4,446,100 and its divisional patent, U.S. Pat. No. 4,478,789, disclose that when a preformed ceramic powder body is subjected to isostatic pressing at the sintering temperature, it must, in order to give a desired dense product, be enclosed in a casing which, during the pressing, is able to prevent the pressure medium then used, normally a gas, from penetrating into the powder body. The casing, like its contents, is liberated from undesirable gases during a process stage prior to the sealing. Various ways of forming the casing are known.

According to U.S. Pat. No. 4,446,100, one method known prior to U.S. Pat. No. 4,446,100, a preformed capsule of glass is used as casing. In another known method, according to U.S. Pat. No. 4,446,100, the casing is manufactured on the spot by dipping the preformed powder body into a suspension of particles of glass, or surrounding it in some other manner with a layer of particles of glass and then heating it under vacuum at such a temperature that the particles form a tight casing around it. As far as silicon nitride is concerned, it is also known to use a porous layer of a glass of a low-melting type outside a porous layer of glass of a high-melting type. According to the above patent, the outer porous layer is transformed into a layer impermeable to the pressure medium while the powder body is degassed. When a tight layer has been formed, pressure is applied to the enclosed powder body by argon or helium to counteract dissociation of the silicon nitride when the temperature is continually raised. During the continued temperature increase, the glass in the outer layer reacts with the material in the inner porous layer while forming an increasingly high-melting glass and while maintaining a layer impenetrable to the pressure medium, and finally a glass layer which is impenetrable to the pressure medium is formed from the innermost part of the inner porous layer before the glass in the outer layer has time to run off. This last formed glass layer forms a casing around the powder body when the isostatic pressing thereof is carried out at the sintering temperature.

In the method which is the subject matter of U.S. Pat. No. 4,446,100, there is disclosed a method wherein a $B_2O_3$ containing glass is used to obviate glass penetration into the silicon materials.

U.S. Pat. Nos. 4,446,100 and 4,478,789 and the disclosures thereof are incorporated herein by reference.

U.S. Pat. Nos. 4,462,816 and 4,462,817 and 4,462,818 all relate to various aspects of the manufacture of multiple silicon nitride articles using hot isostatic pressing. Each of these patents pertain to the hot isostatic pressing of more than one part at a time.

In these patents, two or more preforms are stacked together and are then encapsulated within a single capsule to be hot isostatically pressed. In order to prevent the preforms from diffusion-bonding to each other during hot isostatic pressing, suitable refractory spacers are placed therebetween. The spacers must be inert with respect to the silicon nitride preforms and must have melting point greater than the hot isostatic pressing temperature. If the spacer material, for example, alumina, is insufficiently inert with respect to the silicon nitride preforms, the alumina spacer may be coated with boron nitride to provide the desired inertness. In some cases it may be desirable to completely wrap the stack of preforms in a suitable metal foil prior to encapsulating the stack, in a capsule, the reason being to prevent any loose particles of powder that may be present on the stack from interfering with the formation of a sealed capsule.

Each of these patents and their respective disclosures incorporated by reference herein.

Use of glass in hot isostatic pressing, while effective for porosity removal from the ceramic, requires removal of adhered glass from the articles after the hot isostatic pressing step. Sometimes the removal is difficult, requiring machining or sand blasting of the pressed articles. Furthermore, in some instances some of the materials used may react with the material being pressed thereby creating undesirable second phases.

It is believed therefore a hot isostatic pressing process that will provide porosity removal and will enable the production of an article essentially free of adhered encapsulating material and of secondary phases would be an advancement in the art.

SUMMARY OF THE INVENTION

In accordance with one aspect of this invention there is provided, a process comprising (a) providing a non-reactive container with a green article and sufficient solid encapsulating agent selected from the group consisting of tin and the tin-magnesium eutectic to encapsulate the green article when the encapsulating agent is in the molten state, (b) raising the temperature of the container sufficiently to melt the agent and to encapsulate the article, (c) maintaining the resulting encapsulated article at a pressure below the infiltration pressure of the green article while heating the encapsulated article sufficiently to create a surface on the article that is essentially free of connected porosity, and thereafter, (d) increasing the pressure on the encapsulated article while maintaining the article at its sintering temperature for a sufficient time to increase the density of said article to at least about 98% of theoretical, (e) decreasing the temperature to a point slightly above the encapsulating agent melting point, decreasing the pressure to atmospheric, and removing the dense ceramic article from the molten agent.

In accordance with an additional aspect of this invention the article is selected from the group consisting of silicon nitride based ceramics, sialon based ceramics, silicon carbide based ceramics and aluminum oxide based ceramics.

In accordance with another aspect of this invention a silicon nitride based ceramic containing magnesium oxide is hot isostatically pressed using an encapsulating agent of the eutectic alloy of tin and magnesium.

In accordance with still another aspect of this invention the silicon nitride based ceramic consists essentially of a major amount of silicon nitride and a minor amount of a sintering aid selected from the group consisting of yttrium oxide, aluminum oxide and mixtures thereof.

In accordance with still an additional aspect of this invention the average pore size in the green article less than about 0.5 micrometers diameter and the initial pressure is maintained below about 200 psi until a density of about 93% of theoretical is achieved.

In accordance with other aspects of this invention the final pressing pressure is from about 1000 psi to about 30,000 psi and the pressing temperature is from about 1750° C. to about 1950° C.

In accordance with certain aspects of this invention the non-reactive container is selected from boron nitride, silicon nitride, graphite, silicon carbide and aluminum oxide.

In accordance with one aspect of this invention the article is heated to at least about 700° C. in a vacuum to melt the encapsulating agent.

DETAILED DESCRIPTION

For a better understanding of the present invention together with other and further objects, advantages and capabilities thereof, reference is made to the following detailed description and appended claims in connection with the above summary and drawings.

It has been found that while glass encapsulation in accordance with the prior art is satisfactory to remove the porosity, there are additional problems.

One such problem is that in some instances with certain ceramics, the boron and sodium that are present in the glasses used as the encapsulating agents react with the ceramic being hot isostatically pressed. Trace contamination can adversely affect the desired properties of the ceramic.

Another problem is that long cycles are needed in order to control glass melting and solidification. It is also necessary that the glass used as the encapsulation agent and the densified ceramic have coefficients of expansion that are closely matched because after the ceramic is subjected to the hot isostatic pressing cycle, the glass is solidified and then removed from the article. If the coefficients of expansion are not matched, stresses can occur in the ceramic to cause premature failure of the ceramic.

As previously mentioned, the glass adheres to the surface of the ceramic article and has to be mechanically removed or chemically etched away. This additional step results in additional manufacturing costs and increased production time.

Many of the glasses suitable for encapsulation are incompatible with many chemicals used in ceramics, such as SiC, $Al_2O_3$, $Y_2O_3$ and $ZrO_2$.

The glass encapsulating agent is not recyclable and, therefore, is considered a raw material cost. In a similar manner, the boron nitride coating and the molybdenum foil used in the processes disclosed in U.S. Pat. Nos. 4,462,816; 4,462,817 and 4,462,818 add to the cost of the process since they are consumed as a part of the hot isostatic pressing operation.

In the present invention, both the encapsulating agent and the container used to hold the articles being hot isostatically pressed and the liquid encapsulating agent and the means for maintaining the article encapsulated are reused. Additionally, the encapsulating agent selected from tin and the tin-magnesium eutectic alloy are relatively non-reactive with the ceramic materials under the hot isostatic pressure, conditions utilized in the practice of this invention.

Because the densified article, after it has been hot isostatically pressed, is removed from the liquid encapsulating agent by merely lifting the article from the pool of the liquid agent and the agent does not wet the surface of the article, there is no subsequent removal problem. Furthermore, the cycles used are shorter because there is no need to control the solidification of the encapsulating agent because the encapsulating agent can be kept in the liquid state.

Figure 1:
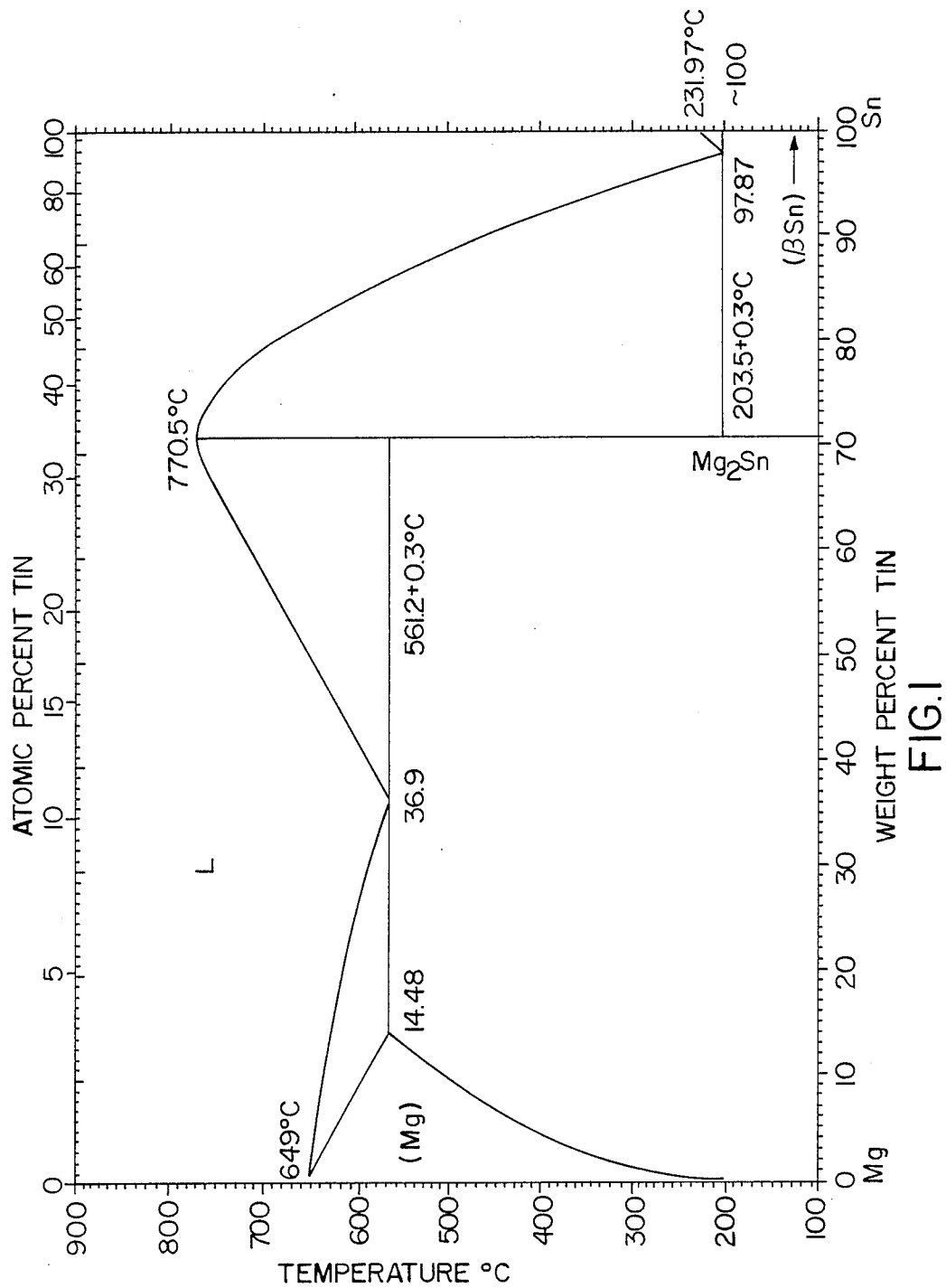
FIG. 1 is a phase diagram of the Sn—Mg alloy system showing the Sn—Mg alloy eutectic having a MP of about 203.5° C.

Tin is unreactive with most of the ceramic materials of interest. The exception is magnesium and this is obviated by the use of the tin-magnesium eutectic alloy. As shown in FIG. 1, the eutectic exists at about 98.8% tin, balance Mg and that the eutectic melts at about 203.5° C.

In the practice of this invention, conventional isostatic pressing equipment can be used. The pressing chamber is provided with a container for the liquid encapsulating agent and the articles to be densified. In the cases where the articles being densified have a density less than tin, it may be necessary to provide the container with a means for keeping the articles encapsulated. Tin has a density of about 6.2 g/cc at about 1400° C. and a density of about 6.95 g/cc at its melting point. Most ceramic materials have densities less than that of tin. The magnesium-tin eutectic has essentially the same density as tin.

It is necessary that the container and the means for keeping the articles encapsulated, if one is utilized, be non-reactive with the encapsulating agent. Suitable non-reactive materials include boron nitride, graphite, fully dense $Si_3N_4$ based ceramics, silicon carbide and aluminum oxide.

After the green article and the solid encapsulation agent are placed in the container in the pressure chamber, the temperature is raised above the melting point of the encapsulating agent. While the encapsulating agent will melt in the 204° C. to 232° C. range, it is preferred to heat in a vacuum at about 700° C. for about 15 to 45 minutes to insure all encapsulating material is melted and that the article is outgassed.

Thereafter, pressure is applied depending upon the size of the pores in the green ceramic, as is explained more in detail below.

Figure 2:
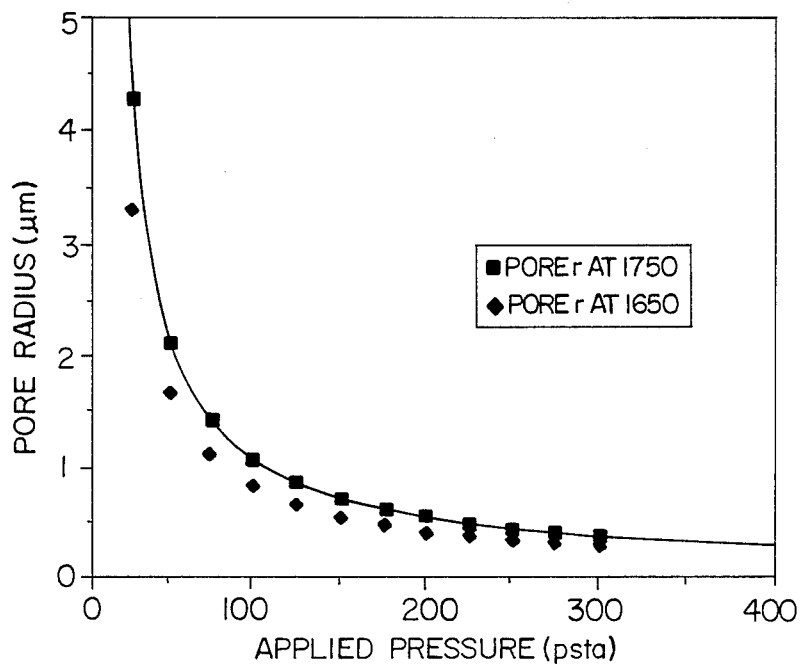
FIG. 2 is a plot of the pore radius (0.5 to 5 micrometers) of the green ceramic versus the applied pressure at which liquid tin will infiltrate the green ceramic.

FIG. 2 is a plot showing the maximum pore radius and the pressure at which the liquid tin will infiltrate into the green body.

Figure 3:
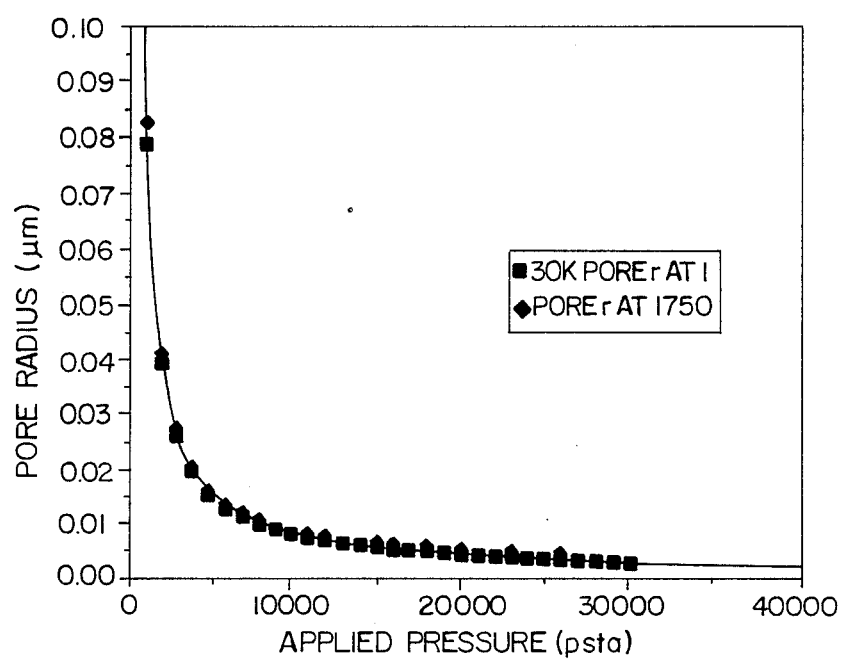
FIG. 3 is another plot of the pore radius (0.005 to 0.1 micrometers) of the green ceramic versus the applied pressure at which liquid tin will infiltrate the green ceramic.

FIG. 3 is another plot showing the infiltration pressures required at smaller pore sizes.

In most instances, when the maximum pore radius in the green ceramic is below about 0.005 micrometers, thus, the surface is essentially free of connected pores. At this point, the pressure can be increased to about 20,000 psi to achieve full density of the article. It has been found that this occurs at a density of about 93% of theoretical.

In a typical process, a green article having a maximum pore radius of 0.5 micrometers is encapsulated in tin by raising the temperature of the heating chamber to about 700° C. A vacuum of less than 300 millitorr is maintained. The temperature of about 700° C. is maintained for about 0.5 hours, after which the pressure is raised to about 200 psi and the temperature is raised to between 1750° C. to 1950° C. depending on the ceramic for about 1 hour, after which time the surface of the material is essentially free of pores. The pressure in the chamber can be increased to about 20,000 psi and maintained for about 1 hour to achieve a density greater than about 99% of theoretical.

The implementation of the subject invention is illustrated by the examples set forth below. The examples are for illustrative purposes and are not to be construed as limiting the invention. Unless otherwise stated, all parts, proportions portions and percentages are by weight.

EXAMPLE 1

An article having a green density of about 60% of theoretical is fabricated from a relatively uniform particulate admixture consisting essentially of about 92% silicon nitride, 6% yttrium oxide and about 2% aluminum oxide. The admixture has an average particle size of about one (1) micrometer. The density is achieved by isopressing the admixture at about 20,000 psi and the maximum pore radius in the green article is determined to be about 0.5 micrometers.

The article is placed in a boron nitride container and a sufficient amount of tin pellets are used to surround the article so as to completely encapsulate the green article when the tin is melted. The chamber of the hot isostatic pressing unit that holds the container, which is equipped with a graphite means for holding the article submerged in the liquid tin, is evacuated to a vacuum of less than 300 millitorr and the temperature in the chamber is raised to about 700° C. and held for about 30 minutes. The pressure is increased to about 200 psi and a nitrogen atmosphere is provided in the chamber. The temperature is increased to about 1775° C. and held for about 1 hour. The pressure is then increased to about 20,000 psi and held at 1775° C. and 20,000 psi for about 1 hour. The chamber is cooled to about 250° C. and the pressure decreased to atmospheric. An article of 92% $Si_3N_4$, 6% $Y_2O_3$ and 2% $Al_2O_3$ and having a density of about 99.5% of theoretical is lifted from the molten tin. No tin adheres to the surfaces of the article.

EXAMPLE 2

Following the procedure of Example 1 a particulate material consisting essentially of about 93% $Si_3N_4$, about 3.5% $Y_2O_3$ and about 3.5% MgO is fabricated into a green article having a density of about 60% of theoretical by pressing as in Example 1. The maximum pore size is also similar to that in Example 1.

A similar pressure temperature cycle as to that used in Example 1 is employed and an article that is essentially fully dense is produced.

While there has been shown what is considered at the present the preferred embodiments, other modifications to the subject invention are possible and will occur to those skilled in the art without departing from the scope of the subject invention.

What is claimed is:

1. A process comprising
   (a) providing a non-reactive container with a green article and sufficient solid encapsulating agent selected from the group consisting of tin and the tin-magnesium eutectic to encapsulate said green article when said agent is in the molten state,
   (b) raising the temperature of the container sufficiently to melt said agent and to encapsulate said article,
   (c) maintaining the resulting encapsulated article at a pressure below the infiltrating pressure of the green article while heating said encapsulated article sufficiently to create a surface on the article that is essentially free of connected porosity and thereafter,
   (d) increasing the pressure on the encapsulated article while maintaining the article at its sintering temperature for a sufficient time to increase the density of said article to at least about 98% of theoretical.

2. A process according to claim 1 wherein said green article is selected from the group consisting of silicon nitride based ceramics, sialon based ceramics, silicon carbide based ceramics and aluminum oxide based ceramics.

3. A process according to claim 2 wherein said article is a silicon nitride based ceramic.

4. A process according to claim 3 wherein said ceramic contains magnesium oxide and said agent is the tin-magnesium eutectic.

5. A process according to claim 3 wherein said silicon nitride based ceramic consists essentially of a major amount of silicon nitride and a minor amount of a sintering aid selected from the group consisting of yttrium oxide, aluminum oxide and mixtures thereof.

6. A process according to claim 3 wherein the average pore size in said green article is less than about 0.5 micrometers diameter and said pressure in step c is maintained below about 200 psi until a density of about 93% of theoretical is achieved.

7. A process according to claim 5 wherein the average pore size in said green article is less than about 0.5 micrometers diameter and said pressure in step c is maintained below about 200 psi until a density of about 93% of theoretical is achieved.

8. A process according to claims 3 wherein the pressure in step d is from about 1,000 psi to about 30,000 psi and the temperature is from about 1750° C. to about 1959° C.

9. A process according to claim 5 wherein the pressure in step d is from about 1,000 psi to about 30,000 psi and the temperature is from about 1750° C. to about 1950° C.

10. A process according to claim 1 wherein said non-reactive container is selected from boron nitride, silicon nitride, graphite, silicon carbide and aluminum oxide.

11. A process according to claim 1 wherein said article is heated to at least about 700° C. in a vacuum prior to step (d).

* * * * *